Sept. 4, 1951     A. H. MAYNARD     2,567,021
STAPLE EXTRACTOR
Filed April 8, 1949
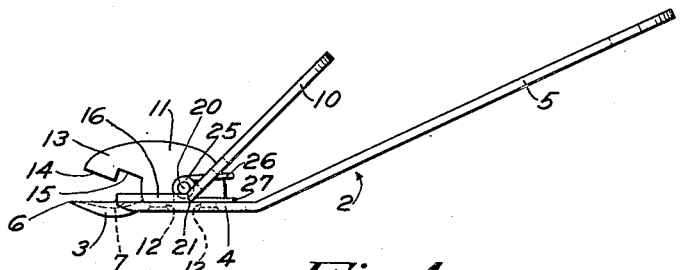
*Fig. 1.*
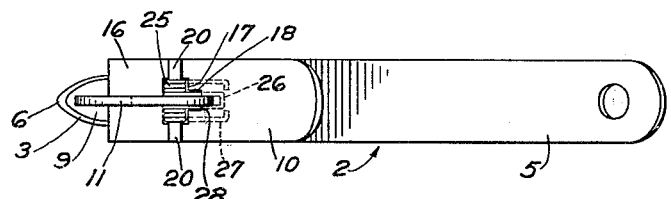
*Fig. 2.*
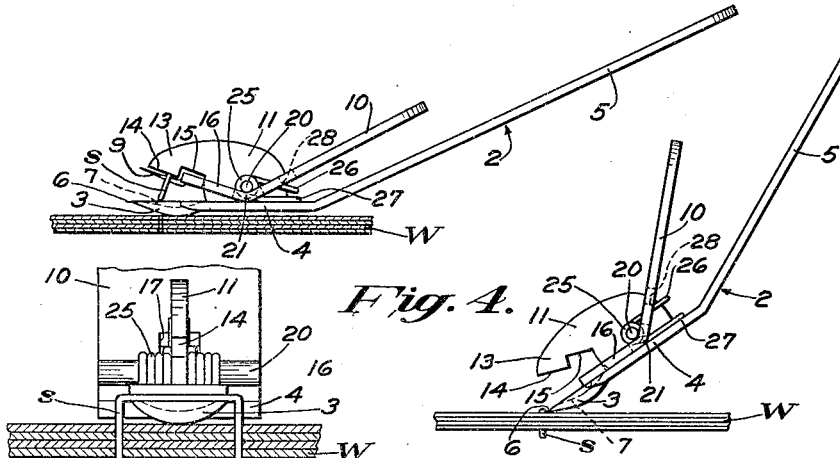
*Fig. 4.*
*Fig. 3.*
*Fig. 5.*
*Fig. 7.*
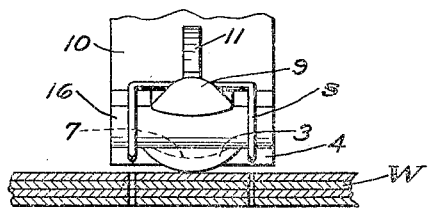
*Fig. 6.*
Inventor:
Arthur H. Maynard
By
Attorneys.

Patented Sept. 4, 1951

2,567,021

UNITED STATES PATENT OFFICE 2,567,021

STAPLE EXTRACTOR

Arthur H. Maynard, Warwick, R. I., assignor to Bostitch, Inc., Stonington, Conn., a corporation of Rhode Island Application April 8, 1949, Serial No. 86,210

2 Claims. (Cl. 254—28)

1

This invention relates to staple-extractors for removing wire staples and similarly-shaped fasteners from papers or other articles held together thereby.

One object of the invention is to provide a small, compact device of the type indicated which may be used as a desk implement or carried in the pocket.

Another object is to provide an implement of the type indicated comprising a pointed blade for insertion under the head or crossbar of the staple and a lever having an auxiliary blade overlying the main blade and adapted to be rocked upwardly to extract the staple without crinkling or buckling the paper.

Another object is to provide an implement of the type indicated having an abutment overlying the movable blade and adapted to engage the head of the staple as it is withdrawn upwardly by said movable blade to grip the staple and prevent it from flying out to strike the operator or to be projected at a distance from the device.

Another object is to provide an implement of the type indicated which is more convenient and easy to operate for extracting staples by causing their clinched legs to be straightened and withdrawn through the work without mutilating it and to retain the staples in the implement to prevent them from being thrown about to litter adjacent areas.

Further objects of the invention are set forth in the following specification which describes a preferred form of construction of the device, by way of example, as illustrated by the accompanying drawing. In the drawing:

Fig. 1 is a side elevational view of the present improved staple-extractor;

Fig. 2 is a plan view of the same;

Fig. 3 is a side view of the implement illustrating the method of inserting its cooperating blades under the head of a staple;

Fig. 4 is a similar side view showing the method of operating the movable blade to withdraw the staple and grip it to prevent it from flying away from the implement;

Fig. 5 is an enlarged front elevational view of the implement showing the essential parts of the implement illustrated in position with the staple partly withdrawn;

Fig. 6 is a similar view showing the implement at the end of the staple-extracting operation with the staple completely withdrawn and held thereon; and Fig. 7 is a plan view of the finger-lever embodying the lifter-blade shown as disassembled from the handle-member.

Referring to the drawing, the present improved staple-extractor comprises a main member 2 which may be constructed from a flat strip of sheet-metal to provide a forwardly-projecting tapered blade 3 extended rearwardly in a flat portion 4 with a handle 5 projecting upwardly therefrom in inclined relation to its flat portion. The blade 3 is of peculiar form, being generally tapered toward its forward end in plan view and terminating in a rounded point 6. As shown in Figs. 3 and 4, the bottom of the blade is rounded or of convex shape tapering forwardly toward its pointed end 6 to provide a relatively thin sharp edge where it meets the upper face. As shown by dotted lines in Figs. 4 and 5, the flat top of the blade 3 is recessed to form a concavity 7 adapted to receive the cooperating upper lifter-blade 9. The lifter-blade 9 forms the forepart of a finger-lever 10 rockably mounted on the main member 2 in a manner as later explained.

Rising from the top of the forepart of the handle-member 2 is a plate-like member 11 which may be formed with a pair of lugs 12 riveted through the flat portion 4 of the handle-member, as shown by dotted lines in Fig. 1, or secured thereto by other suitable means such as brazing or welding. The member 11 has a curved or crowned upper portion extending forwardly in an offset abutment 13 overhanging the top of the main blade 3 at a distance thereabove with its lower edge 14 in inclined relation thereto. Rearwardly of the abutment 13 the member 11 is cut away with a square-shaped notch 15 designed for a purpose as later explained.

The finger-lever 10 embodying the auxiliary lifter-blade 9 has a flat portion 16 adapted to overlie and rest on the flat portion 4 of the handle-member 2 with its rearward end projecting upwardly at an angle thereto to form the finger-engaging portion of the lever. The finger-lever 10 is pivoted to the member 11 on the handle-member 2 by a novel and ingenious form of construction as next described. Referring to Fig. 7, the flat portion 16 of the finger-lever 10 is slotted with a rectangular opening 17 extended rearwardly and forwardly in narrower portions 18 and 19 to adapt the plate-member 11 to project through the opening with the sides thereof abutting the sides of the plate-member.

A transverse pivot-pin 20 is held in a hole 55 in the member 11 with its ends overlying the lever 10 where its flat portion 16 joins the inclined rearward part thereof, the bend between these two parts of the lever forming a curved bearing 21 of small radius at the point of their joinder. The ends of the pin 20 engage against this curved bearing 21 to adapt the lever 10 to rock or pivot about the axis of the pin when the rearward portion of the lever is tilted downwardly as shown in Fig. 4. The lever 10 is normally held with its flat portion 16 seated against the top of the flat portion 4 of the main member 2 by a two-part spring 25 coiled about the pin 20 at either side of the member 11. The spaced series of coils of the spring 25 abut the sides of the member 11 and the two inner coils are extended rearwardly in a U-shaped loop of wire 26 inserted through the narrowed slot or opening 18 in the lever 10 to engage against the shoulders 28 at the end thereof as shown in Figs. 2 and 3. The opposite or outer ends of the coils of the spring 25 project rearwardly through the wider opening 17 in the lever 10 in a pair of legs 27 engaging against the top of the flat portion 4 of the handle-member 2, thereby maintaining the spring under tension tending to rock the lever 10 to hold its flat portion 16 seated against the flat portion 4 of the handle-member. With the spring 25 thus tensioned its coils frictionally bind around the pin 20 to hold it in place in the transverse hole of the member 11. On the other hand, the U-shaped loop 26 of the wire which extends from the inner coils of the spring 25 engages through the narrower portion 18 of the slot 17 in the lever 10 to prevent side play of the latter and maintain it in alinement with the main member 2. The lever 10 is restrained from forward or rearward displacement by the engagement of the ends of the pin 20 with the bearing portion 21, it being understood that the two coiled parts of the spring 25 project down into the opening 17 in the lever 10 as indicated by dotted lines in Figs. 3 and 4. By means of this ingenious construction and arrangement of the pivot-joint between the lever 10 and the handle-member 2 the use of screws, rivets and other conventional hinging means is eliminated, thus resulting in economy of manufacture and convenience in assembling the parts of the device. It will be noted that the upper auxiliary blade 9 which projects forwardly from the lever 10 is of substantially the same outline as the blade 3 in plan view with a convex or rounded under side to adapt it to fit closely within the concavity 7 of the lower blade on the handle-member 2. As shown more particularly in Fig. 4, the auxiliary blade 9 is of extremely thin cross-section and offset downwardly from the end of the flat portion 16 of the lever 10. When the rearward end of the lever 10 is depressed toward the handle 5 of the handle-member 2 the auxiliary lifter-blade 9 will be rocked upwardly into substantial alinement with the inclined edge 14 of the abutment 13 at the end of the plate 11 with the end of the flat portion entering the notch 15. Consequently, as the lifter-blade 9 is rocked upwardly to withdraw the staple s from the work W the head of the staple will be carried into engagement with the edge 14 of the abutment 13 to bind or clamp it thereagainst and prevent it from being projected upwardly or outwardly away from the implement.

The method of operation of the present improved staple-extractor is explained as follows: The implement may be gripped in one hand by placing the fingers under and around the handle 5 of the member 2 and resting the thumb of this hand against the angular extension of the finger-lever 10. The handle-member 2 may then be placed at a relatively sharp angle to the work W and the point 6 of the blade 3 inserted under the head of the staple s as indicated in Fig. 3 of the drawing. The two blades 3 and 9 are next slid forwardly until the greater portion of their width is under the head of the staple, whereupon the thumb may be pressed down on the lever 10 to rock it and withdraw the lifter-blade 9 from the concavity in the lower blade 3. It will be understood that as the two tapering blades 3 and 9 are inserted in under the head of the staple s the latter will be wedged upwardly to withdraw its legs through the work W, the clinched ends of the legs of the staple being gradually straightened during this operation as indicated in Fig. 5. Eventually, as the lever 10 is depressed to raise the lifter-blade 9 the staple s will be completely withdrawn and carried up on the lifter-blade to clamp it against the inclined edge 14 of the abutment 13 on the member 11 to hold it in place and prevent its escape from the implement. Then when the lever 10 is released the spring 25 will rock it back into first position, thereby releasing the staple s so that it can be dropped into a wastebasket or other receptacle without littering the top of the desk or other surfaces adjacent thereto. In this way the present device may be operated conveniently and expeditiously to remove staples from the work without danger of their flying up to strike the face of the user or to be thrown about to litter adjacent objects.

As before indicated the present device is of novel design and construction with the operating lever pivotally jointed to the main member without the use of screws, rivets or other like elements, the pivot-pin 20 being held in place by the spring 25 without requiring riveting or heading over its ends so that the several parts of the device may be readily assembled, while making for economical cost of manufacture of the implement.

While the implement is herein shown and described as embodied in a preferred form of construction it is to be understood that modifications may be made in the shape and arrangement of its parts without departing from the spirit or scope of the invention as expressed in the accompanying claims. Therefore, without limiting myself in this respect, I claim:

1. In a staple-extracting implement, a handle-member having a flat portion with a pointed blade projecting forwardly therefrom and formed with a concavity in its upper face, a rigid plate-like member projecting upwardly from the flat portion of the handle-member in perpendicular relation thereto and terminating in an inclined edge overlying the top of the blade on the handle-member in spaced relation thereto, a finger-lever formed with a lifter-blade adapted to seat in the concavity in the blade on the handle-member, means for pivotally mounting said finger-lever on the handle-member to adapt it to rock in relation thereto to raise the lifter-blade from the concavity in the blade on the handle-member and carry it toward the inclined edge of the abutment member, and a spring acting between the handle-member and the finger-lever to normally maintain the latter with its blade seated in the concavity in the upper face of the blade on said handle-member.

2. In a staple-extracting implement, a handle-member having a flat portion with a pointed blade projecting forwardly therefrom and formed with a concavity in its upper face, an abutment projecting upwardly from the flat portion of the handle-member and terminating in an inclined edge overlying the top of the blade on the handle-member in spaced relation thereto, a finger-lever formed with an opening through which the abutment projects with the sides of the opening abutting the sides thereof, said finger-lever having a pointed blade adapted to seat in the concavity in the upper face of the blade on the handle-member, a pin projecting through a hole in the abutment with its ends overlying a curved bearing portion on the finger-lever, and a spring comprising spaced series of coils surrounding the pivot-pin at the sides of the abutment, the inner coils of said spring being extended in a U-shaped loop projecting through the opening in the lever to engage the end thereof and said outer spring-coils extended in legs projecting through the opening in the lever and bearing against the flat portion of the handle-member to normally rock said lever to maintain the lifter-blade seated in the concavity of the main blade.

ARTHUR H. MAYNARD.

REFERENCES CITED

The following references are of record in the file of this patent:

UNITED STATES PATENTS

| Number | Name | Date |
| --- | --- | --- |
| 1,166,419 | Allan | Jan. 4, 1916 |
| 2,481,647 | De Generes | Sept. 13, 1949 |